United States Patent [19]
Kalus

[11] 3,712,013
[45] Jan. 23, 1973

[54] DEVICE FOR FIXING PANELS AND ASSEMBLY

[75] Inventor: Serge Kalus, Saint Maurice, France

[73] Assignee: Cegedur GP., Paris, France

[22] Filed: Feb. 16, 1971

[21] Appl. No.: 115,369

[30] Foreign Application Priority Data

Feb. 17, 1970 France..................................7005581

[52] U.S. Cl. ..........................52/584, 52/127, 52/493, 292/111
[51] Int. Cl................................................E04c 1/10
[58] Field of Search........52/582, 584, 493, 495, 498, 52/499; 292/111, 124, 127

[56] References Cited

UNITED STATES PATENTS

| 2,208,908 | 7/1940 | Minor | 292/127 X |
|---|---|---|---|
| 896,786 | 8/1908 | Williams | 292/127 |
| 2,158,081 | 5/1939 | Morrell | 52/495 |
| 3,180,459 | 4/1965 | Liskey, Jr. | 52/495 |
| 3,400,505 | 9/1968 | Hart-Still | 52/498 X |

FOREIGN PATENTS OR APPLICATIONS

| 120,309 | 8/1945 | Australia | 292/124 |
|---|---|---|---|
| 225,221 | 1/1963 | Austria | 52/582 |

Primary Examiner—Alfred C. Perham
Attorney—McDougall, Hersh & Scott

[57] ABSTRACT

A device for fastening rigid panels and an assembly embodying same wherein the fastening device is formed of a base and an upright portion and a hook member mounted for rotation on a shaft at one end and defining a hook at the other end and an intermediate release projection therebetween, and means for constantly urging the hook member away from the upright portion for engagement of the hook in openings in adjacent contiguous panels.

6 Claims, 9 Drawing Figures

PATENTED JAN 23 1973

INVENTOR
Serge Kalus
BY McDougall, Hersh and Scott

DEVICE FOR FIXING PANELS AND ASSEMBLY

The present invention relates to a device for the invisible fastening of interchangeable panels, such as wall, ceiling panels, etc.

Presently panels such as those panels constituting a wall lining are fastened by screws or clips. If it is impossible to gain access to both sides of these mounting panels, it is necessary to use a cover joint to hide the screw heads, an operation normally done by clipping. However, the clips quickly rust and the joints no longer hold in place. The fixing of entire panels by clipping, particularly by clips on the outside is even more disadvantageous because the danger of the panels being removed by the force of wind or the like.

The panels whose edges are shaped to permit an encasing do not have the above mentioned disadvantages, but they require an advance mounting and it becomes impossible to individually remove a damaged panel.

It is accordingly an object of the present invention to provide a device for the fastening of panels and to provide an assembly embodying same which overcomes the foregoing disadvantages, and it is a more specific object of the invention to provide a device for use in the fastening of interchangeable panels which permits simple and efficient assembly and disassembly of such panels, which is invisible when positioned for use and which can be used in the mounting of panels having varying thicknesses.

These and other objects of the invention will appear more fully hereinafter, and, for purposes of illustration and not of limitation, and embodiment of the invention is shown in the accompanying drawings in which.

Figure 1:
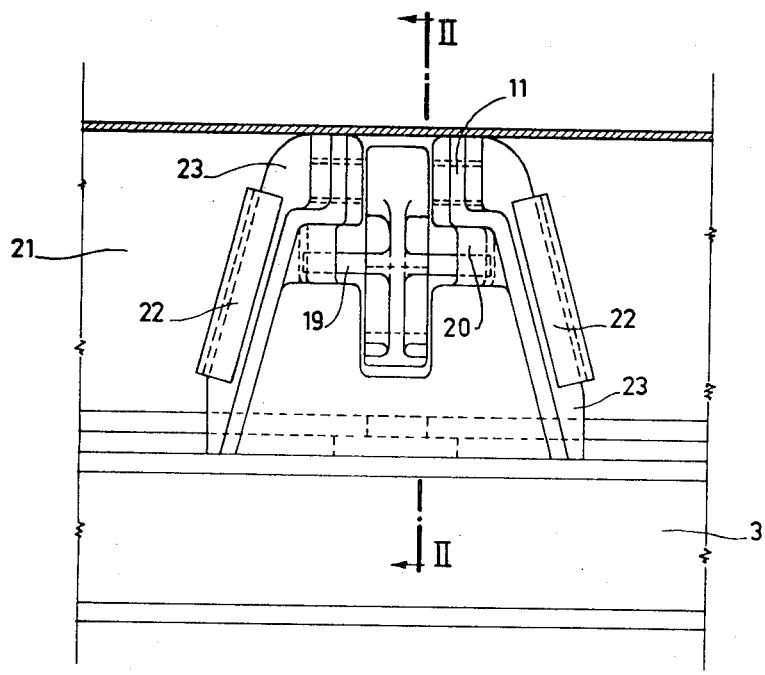
FIG. 1 represents the fixation device as it is placed on the lateral side of a caisson-shaped panel.
Figure 2:
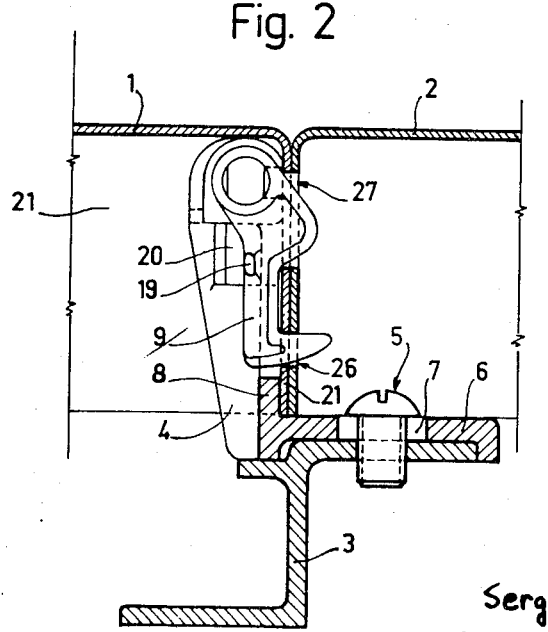
FIG. 2 represents a section along II—II of FIG. 1.
Figure 3:
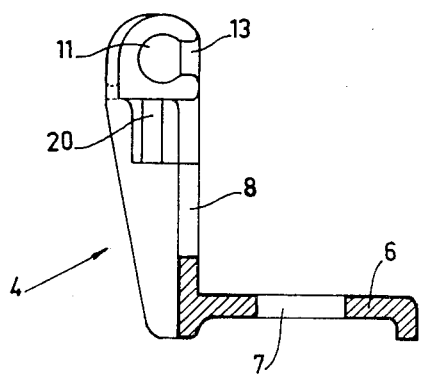
FIG. 3 represents the fixation part alone along the same section II—II of FIG. 1.

The concepts of the present invention result in an improved device for mounting rigid panels and the like in the form of a fixed part comprising a base adapted to be mounted on a rail or the like, and an upright portion extending away from the base. The upright portion carries a hook member rotatably mounted at one end thereof, and defining a hook at the opposite end thereof and a slipping release projection intermediate between the ends of the hook member. The hook member is spring biased away from the upright portion to constantly urge the hook and the release projection away from the upright portion of the fixed part.

Holding means are provided inside the lateral sides of the panels to prevent any shifting of the fixation devices in a direction perpendicular to said sides, and each lateral side also has, between the holding devices, two openings, one providing passage for the release protuberance, the other one for the hook.

The fastening device of the invention is thus held in its engaged position by the spring means, such as with the hook of the device extending through corresponding openings in contiguous lateral sides of adjacent panels to fix the panels each to the other by a spring which may be formed of a thin blade perpendicular to the longitudinal axis of said bolting member and parallel with its axis of rotation, its ends being held in two housings of the upright portion.

In order to release the hook and a panel, it suffices to insert a thin blade between the panels at the level of the fixation devices said instrument being able to slide on one of the ramps of the release protuberance, thus causing the displacement of the bolting hook.

In the embodiment illustrated in FIGS. 1–6, the hollow panels or caissons 1 and 2 which are formed of metal or the like rigid material are sought to be fastened removably to the support rail 3. For that purpose, the fixation part 4 is adapted to be fastened to the rail 3 with the aid of the screw 5.

This fixed part 4 is formed of a base 6 provided with an oblong hole 7 allowing for passage of the screw 5 and an upright member such as a plate 8 perpendicular to the base 6, shaped for mounting adjacent the edge of the panel 1 and carrying the hook member.

Figure 4:
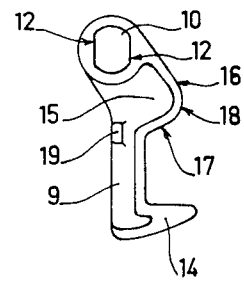
FIG. 4 shows the bolting member viewed in a direction parallel to its axis of rotation.

The hook member 12, shown more specifically in FIG. 4, comprises a shaft 10 which can rotate freely in the cavity or recess 11 of the vertical plate 8 of the side opposite the base 6. To permit its introduction into the cavity 11, the shaft 10 is provided with flat surfaces making it possible to insert shaft 10 through the slot 13 leading to cavity 11. At the end opposite the shaft 10, the bolting member 9 terminates into a bolting hook 14. Between this hook 14 and the shaft 10 there is a release projection 15 defined by two ramps 16 and 17 whose surfaces bisect along a crest or ridge 18 parallel with the axis of rotation.

On the side opposite this projection, the hook member 9 carries a spring in the shape of a flexible blade 19, whose axis is perpendicular to the longitudinal axis of the member itself, and whose ends, which exceed on both sides the bolting element, are held in a pair of housings 20 defined in the plate 8 to bias the hook member toward an engaged position.

Figure 5:
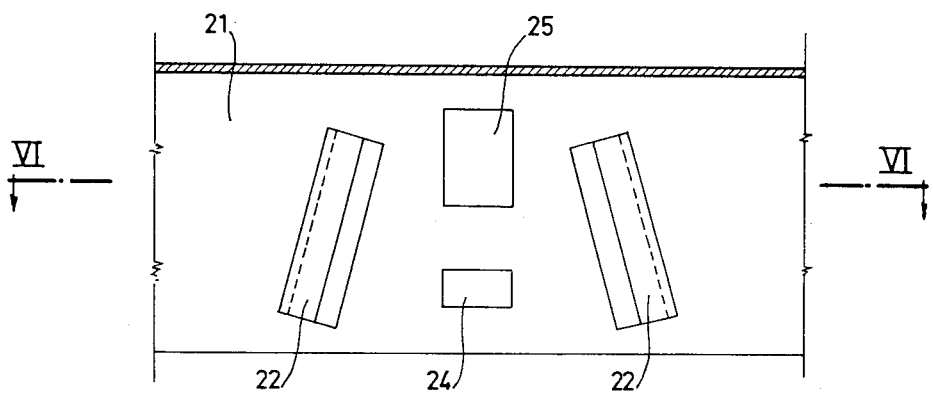
FIG. 5 shows a segment of a lateral side at the level of the emplacement of the fixation device.
Figure 6:
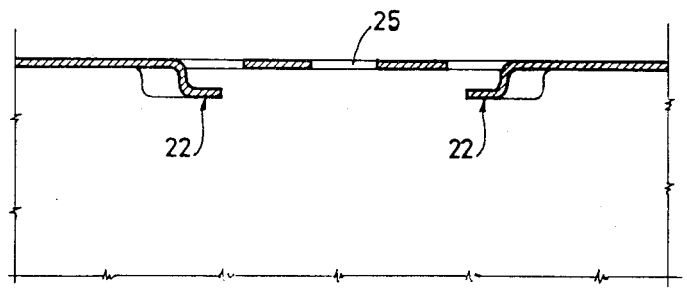
FIG. 6 shows a section along VI—VI of FIG. 5.

The edge 21 of the caisson 1 where the fixed part 4 is to be hooked and the detail of which is illustrated in FIGS. 5 and 6, comprises two slides 22, preferably formed by folded parts originating from the wall of the caisson edge and used to hold the edges 23 of the plate 8. These two slides 22 form between them an angle so as to guide the plate 8 in such a manner that the bolting hook 14 is opposite an opening 24 and penetrates therein to block the fixation member while the release projection penetrates an opening 25. Thus, the plate 8 is immobilized in all directions.

In the side of the contiguous and adjacent plate, corresponding openings 26 and 27 are provided.

The mounting of the panels with the aid of the fixation device of the invention is simple as illustrated by the following description.

The starting panel 1 is fastened, edge side, with an appropriate leg. Fixation parts already have been put in place on the other side of the panel by introducing the edges 23 of the plate 8 behind the slides 22. During this movement, the ramp 16 of the release projection 15 is pressed by the inner side of the reduced edge 21, thereby forcing the projection and hook 14 to be rotated until the moment when the hook 14 and the protuberance 15 are opposite the openings 24 and 25, upon which the ramp and hook penetrate these openings under the thrust of the spring blade 19. The fixed member is bolted on the panel.

Subsequently, the base 6 of the member 4 is screwed to the rail 3 by the screw 5, the oblong form of the opening 7 facilitating the adjustment. The adjacent panel 2 is presented opposite this first fixation with the reduced edge carrying the openings 26 and 27, into which the two projecting portions of the projection 18 and hook 14 penetrate. The opposite edge of the panel in turn carries fixation parts screwed to a rail and the mounting continues in a repetition of the same operations.

The dismantling of one of the intermediate panels is equally simple. Thin blades, for example, blades of putty knives, are slid between both panels at the height of the fixation parts. Each blade strikes against the ramp 16 of projection 15 and causes it to be pressed out of engagement against the action of the spring 19, releasing the bolting hook 14, at the same time. The blades remain in place until all bolts are unblocked, a suction cup placed on the released panel then allows for its easy removal. At the points where the plate 8 was held by the slides 22, the ramp 17 aids to release the projection 15 from the opening 25.

The replacement of a panel is effected simply by pushing it into the proper position in the opening.

Figure 7:
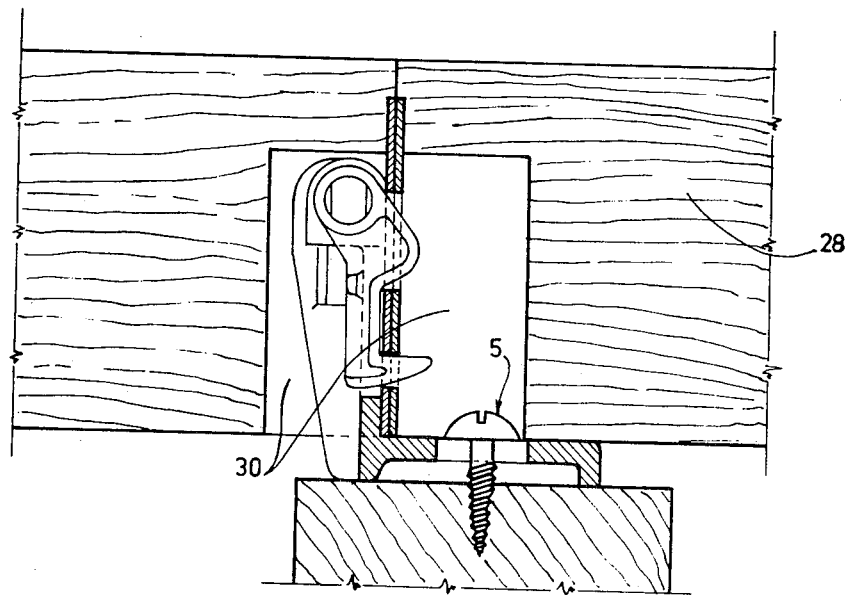
FIGS. 7 and 8 show the application of the device according to the invention in solid panels.
Figure 8:
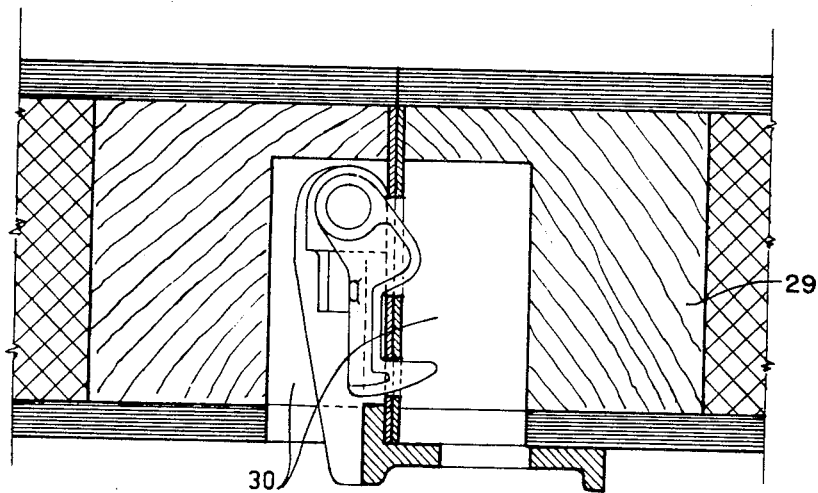
Figure 9:
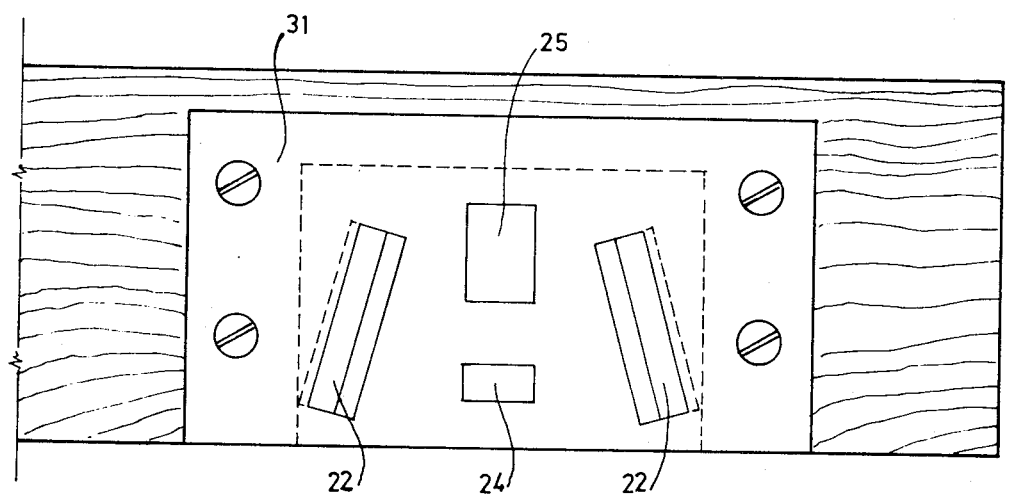
FIG. 9 shows the device in use with solid panels.

FIGS. 7 to 9 show embodiments of the application of the device according to the invention in use for solid panels, such as panels of wood 28 or veneer 29. In this case, cavities 30 are provided in the edges of the panels. These cavities remain open rearwardly to allow the plate 8 to penetrate and possibly also the screw head 5. The lateral side of these cavities, oriented toward the adjacent panel is closed by a small plate 31 carrying the same members as the reduced edge 21 of the caissons described in the preceding example, that is the slides 22 and the openings 24 and 25. The assembly of these members is the same as in the example described above.

The device according to the invention may be used to fasten panels of any size and any material, for example, ceiling panels, panels for walls or curtains, etc.

The fixation members are preferably molded of rigid material, for example, aluminum; the hook elements are preferably of very hard plastic, such as rigid polyethylene or polyamide, which facilitates the sliding of the panel edges on the ramps.

It will be understood that various changes and modifications can be made in the details of construction, procedure and use without departing from the spirit of the invention, especially as defined in the following claims.

I claim:

1. An assembly of at least two rigid panels and a device for fixing the panels to a surface comprising at least a pair of rigid panels, each of the panels having contiguous adjacent lateral walls formed with at least two aligned openings therethrough and at least one of the walls including means to mount a fixing device on the lateral wall thereof, and a fixing device, said device comprising a base and means for fixing the base to a surface, an upright portion extending from the base, a hook member mounted for rotation on a shaft at one end on the upright portion and defining a hook at the other end thereof and an intermediate release projection, and means constantly urging the hook member away from the upright portion for engagement of the hook with one of the aligned openings in the lateral walls of the panel while the release projection extends through the other aligned openings to fix the panels to the surface.

2. An assembly as defined in claim 1 wherein the release projection is defined by a pair of ramp surfaces which bisect along a line parallel to the axis of rotation of the shaft.

3. An assembly as defined in claim 1 wherein the upright portion is formed with recess adapted to receive the shaft, said recess having a slotted opening in the periphery thereof.

4. An assembly as defined claim 3 wherein the shaft is formed with a pair of flattened surfaces on the periphery thereof to enable the flattened surfaces to be inserted through the slotted opening for mounting the shaft in the recess.

5. An assembly as defined in claim 1 wherein the means constantly urging the hook member includes a flexible blade extending parallel to the axis of the shaft to bias the hook member away from the upright portion for engagement with the panels.

6. An assembly as defined in claim 5 wherein the flexible blade extends on opposite sides of the hook member, with the ends of the blade being positioned in housings on the upright portion.

* * * * *